(12) United States Patent
Cahill

(10) Patent No.: US 7,117,512 B1
(45) Date of Patent: Oct. 3, 2006

(54) SCAN ACTIVATED OPTICAL STORAGE ARTICLE AND METHODS THEREOF

(75) Inventor: Bill Cahill, Eagan, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 10/146,477

(22) Filed: May 15, 2002

Related U.S. Application Data

(60) Provisional application No. 60/291,246, filed on May 15, 2001.

(51) Int. Cl.
  *G11B 3/70* (2006.01)
(52) U.S. Cl. .................................................. 720/745
(58) Field of Classification Search ................ 369/273; 235/380, 487, 454; 720/718, 745
  See application file for complete search history.

(56) References Cited

U.S. PATENT DOCUMENTS

| | | | | |
|---|---|---|---|---|
| 4,812,633 | A * | 3/1989 | Vogelgesang et al. | 235/487 |
| 4,868,373 | A * | 9/1989 | Opheij et al. | 235/380 |
| 4,978,146 | A | 12/1990 | Warther et al. | 283/81 |
| 5,168,147 | A | 12/1992 | Bloomberg | 235/456 |
| 5,495,981 | A | 3/1996 | Warther | 229/71 |
| 5,579,296 | A * | 11/1996 | Smith et al. | 369/273 |
| 5,720,158 | A | 2/1998 | Goade, Sr. | 53/460 |
| 5,769,457 | A | 6/1998 | Warther | 283/61 |
| 5,777,305 | A | 7/1998 | Smith et al. | 235/380 |
| 5,918,909 | A | 7/1999 | Fiala et al. | 283/61 |
| 5,921,584 | A | 7/1999 | Goade, Sr. | 283/107 |
| 5,940,363 | A * | 8/1999 | Ro et al. | 369/273 |
| 6,039,356 | A | 3/2000 | Warther et al. | 283/61 |
| 6,173,901 | B1 | 1/2001 | McCannel | 235/493 |
| 6,208,771 | B1 | 3/2001 | Jared et al. | 382/306 |
| 6,484,940 | B1 * | 11/2002 | Dilday et al. | 235/454 |
| 6,510,124 | B1 * | 1/2003 | Wood | 369/273 |
| 6,588,658 | B1 | 7/2003 | Blank | 235/380 |
| 7,032,817 | B1 | 4/2006 | Blank | 235/380 |
| 2002/0020740 | A1 * | 2/2002 | Aarons | 235/380 |
| 2002/0131359 | A1 * | 9/2002 | Wood | 369/273 |
| 2002/0167890 | A2 * | 11/2002 | Duroj | 369/273 |

FOREIGN PATENT DOCUMENTS

GB 2297187 A * 7/1996

OTHER PUBLICATIONS

"ticketCDs—products and applications", *Cutting Edge ShapeCD*, http://www.cdshapes.com/products/ticket-cds.html, (2001), 1 page.
Microsoft Corporation, "Introducing RiverBorne™ Communications," Feb. 23, 2001, pp. 1-17.

* cited by examiner

*Primary Examiner*—A. J. Heinz
*Assistant Examiner*—Mark Blouin
(74) *Attorney, Agent, or Firm*—Westman, Champlin & Kelly

(57) ABSTRACT

An article including: an optical storage medium; and a machine readable mark on at least one side of the optical storage medium, wherein the machine readable mark is adapted to permit activation of a metered account. In embodiments the article can include a detachable member attached to the storage medium, where the detachable member bears a machine readable mark on at least one side and the detachable member can be detached from the optical storage medium after activation of the metered account. The invention also includes printing methods for making the article.

19 Claims, 7 Drawing Sheets

SCAN ACTIVATED OPTICAL STORAGE ARTICLE AND METHODS THEREOF

CROSS-REFERENCE TO RELATED APPLICATIONS

This application claims the benefit of priority to U.S. Provisional Patent Application Ser. No. 60/291,246, filed May 15, 2001, the entirety of which is incorporated herein by reference.

BACKGROUND OF THE INVENTION

The present invention generally relates to a scan activated optical storage article, such as but not limited to a compact disc (CD), a digital video disc (DVD), DVD-RAM, CD-ROM, CD-RW, DVD-R, and the like articles, and to processes of making and using the article, and more specifically the present invention relates to an optical storage article having encoded or encodable markings thereon and which markings are adapted to enable, for example but not limited to, point-of-sale or remote activation, deactivation, or registration of a customer-user metered account, inventory accounting, and optionally point-of-sale or remote activation, deactivation, or registration of the optical storage article, and the like applications.

Optical storage articles, such as compact discs (CD) or a digital video discs (DVD), and prepaid debit cards, such as prepaid phone cards, are ubiquitous. Packaging and means for activating metered accounts associated with the optical storage articles or the debit cards are also known. See for example, the following U.S. patents.

U.S. Pat. No. 5,918,909, issued Jul. 6, 1999, to Fiala, et al., which discloses a method of activating a metered account that is associated with a personal identification number, where the personal identification number is affixed to a card and the metered account is activated at the time of sale of the card, and an apparatus comprising a package adapted for holding the card so that the method of the invention can be practiced. The card includes an exposed data-encoded strip and the card preferably has a personal identification number thereon. The package includes a first panel and a retainer that secures the card to the first panel so that, when the card is secured to the panel, at least a portion of the data-encoded strip is exposed and laterally displaced remote from the panel. The data-encoded strip is encoded with a control number that is associated with the metered account. When the card is purchased, the control number is read from the data-encoded strip while the card is secured to the first panel, and the metered account is activated.

U.S. Pat. No. 5,777,305, issued Jul. 7, 1998, to Smith, et al., discloses a package assembly and method for permitting the activation and deactivation of prepaid debit cards, such as prepaid telephone calling cards, at a point-of-sale. The package assembly has a prepaid debit card with a particular identification number and is contained within a cavity formed between a backing material and a sheath. A machine readable marking is disposed on the package assembly and is detectable by a machine reading apparatus currently used in the industry. The machine readable marking is encoded with information identifying the package assembly as a prepaid debit card and with the identification number of the prepaid debit card. When the machine readable marking is scanned by a machine reading apparatus at the point-of-sale, the identification number of the prepaid debit card, along with an activation or deactivation request, is communicated to a host computer. The host computer retrieves the pre-stored information pertaining to that identification number, processes the information, and either activates or deactivates the card based upon the information received from the point-of-sale. The host computer then communicates the action it has taken to the point-of-sale. If the host computer activated the prepaid debit card, the prepaid debit card can immediately be removed from the package assembly and used to conduct transactions. If the host computer deactivated the prepaid debit card, the prepaid debit card can be restocked at the point of sale for later purchase and activation.

U.S. Pat. No. 6,173,901, issued Jan. 16, 2001, to McCannel, et al., discloses a method for rapidly producing encoded, ink jet printed cards, including providing an encodable and printable card and providing an electronic database with stored data. The method also includes encoding and printing the card by concurrently transferring electronically data from the database to an encoder and to a printer. The data printed on the card is verified for accuracy with a verification mechanism.

On at least Mar. 28, 2001 at the "Cutting Edge ShapeCD" web site < www.cdshapes.com > there was disclosed "ticketCDs™" which ticket article can provide for controlled access to special events. The ticket includes a custom shaped CD-ROM, with optically readable data recorded on one side of the disc, advertising or promotional collateral(s) printed on the other side of the disc, and one or more security features to, for example, thwart counterfeiting, such as, a laser etched serial number, logo, or trademark; or a snap-off security or inventory tab.

All publications or patent documents mentioned above and below are incorporated by reference herein in their entirety.

SUMMARY OF THE INVENTION

The present invention provides, in embodiments, an article of manufacture comprising: a optical storage medium, such as a rotatable disc used in, for example, a CD or DVD media; and a machine readable mark or indicia associated with at least one side of the optical storage medium.

The present invention provides, in embodiments, a method of use of the above mentioned article of manufacture comprising: scanning or machine reading the machine readable mark or marks on the article to activate a metered account which account corresponds to an particular identification number, and optionally separating any detachable member from the optical storage medium.

The present invention provides, in embodiments, a method of making the above mentioned article of manufacture comprising: providing an optical storage medium and optionally a detachable member attached to the storage medium; applying a machine readable mark, such as a magnetic stripe; and encoding the resulting machine readable mark with either or both metered account information and identification number information with, for example, an ink jet printer device or a similar device or devices. In embodiments the encoded metered account information preferably can correspond to the identification number information.

The indefinite articles "a" or "an" mean "one or more" when used in this application including the claims, unless indicated otherwise.

These and other embodiments of the present invention are illustrated herein.

DETAILED DESCRIPTION

Figure 1:
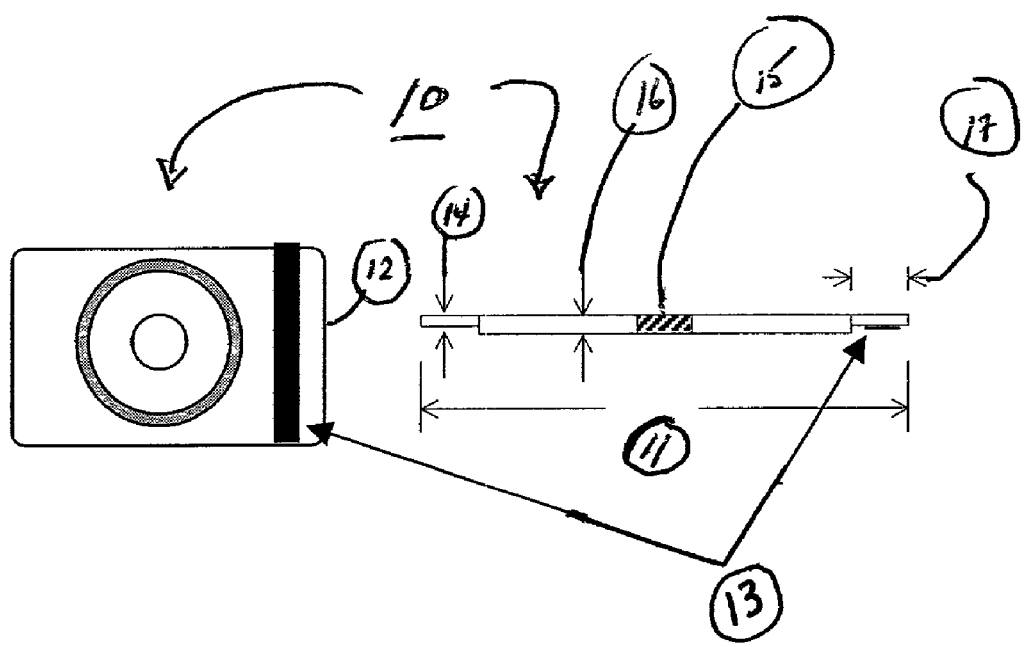
FIGS. 1–7 are illustrative of embodiments of the present invention and they are described sequentially in the corresponding numbered working Examples below.

The above mentioned machine readable mark can be adapted to permit either or both activation or deactivation of a metered account associated with a unique identification number. As used in the present invention the term "activation" and the converse "deactivation" can be used interchangeably in converse circumstances. Thus, for example, "activation of the metered account further comprises activation of billing privileges" also suggests the converse that "deactivation of the metered account further comprises deactivation of billing privileges". "Billing privileges" means, for example, that activation of the metered account associated with the article enables the article to be used to conduct transactions or engage in authorized activities or services, for example, use of a metered pre-paid phone card account, download software, information, data, media, and like transactions or services. Conversely, the deactivation of the metered account associated with the article can, if desired, disable the use of the article to conduct transactions or engage in activities or services as suggested above. In embodiments of the present invention, activation of the metered account can further comprise activation of the optical storage medium, for example, where activation of the metered account includes activation of the optical storage medium such as where the user or customer is provided by the seller or an account manager, proximally or remotely, with a code permitting medium activation. Thus the user or customer can, for example, access information recorded on the optical storage medium, or the user or customer can use the optical storage medium for storing information on the medium. The machine readable mark or indicia can be, for example, a magnetic stripe, a bar code pattern, a glyph code pattern, a hologram, and the like marks or images, and combinations thereof. Glyph code patterns are known, see for example, self-clocking glyph codes, such as Xerox DataGlyphs, reference for example, U.S. Pat. No. 6,208,771 Mar. 27, 2001 Jared, et al., and U.S. Pat. No. 5,168,147, issued Dec. 1, 1992, to Bloomberg. The machine readable indicia, such as a bar code pattern or magnetic stripe pattern, can be applied to either or both sides of the disc with any suitable marking method, including for example without limitation, liquid or dry ink printing, such as thermal ink jet, especially methods such as magnetic image character recognition (MICR) ink jet printing, bubble jet, and acoustic jet; thermal imaging; dye sublimation; and the like methods. The bar code can be any type of bar code, including but not limited to "linear" types with adjacent and alternating light and dark fields; circular or "bulls-eye" type bar codes, and "latent" type that is, for example bar codes which are created or printed with inks which are invisible or not easily observed in visible light by the human eye but which bar codes or equivalent marks can be visualized or read with a specialized illuminant such as an ultraviolet light, infrared light, a laser beam, an x-ray, and the like illuminants.

The machine readable indicia can be encoded with a control number or an identification number that is associated with the metered account. Encoding can be accomplished by applying, for example, by printing with an ink jet printer, a control number or a user identification number, or and account number, or both, and which control or account number corresponds to the encoded metered account, reference the above mentioned U.S. Pat. No. 6,173,901, to McCannel, et al. When the optical storage media article is selected or purchased, the control number can be machine read from the machine readable indicia such as a magnetic data-encoded stripe and the metered account can be electronically activated, for example, locally or remotely.

The unique identification number is associated with the surface of the optical storage medium. Activation permits limited or complete access to, for example, software or services on or associated with data residing on the optical storage medium, for example, a computer program, digital images, recorded music, a directory or listing, and the like information. The activation of the metered account can be accomplished at, for example, a point-of-distribution, a point-of-sale, a point-of-redemption, a point-of-discard or resale, and the like points of authorized dissemination or reclamation of the optical storage medium. The article of manufacture can further include a detachable or separable member and which member bears the above mentioned machine readable mark or indicia. The detachable member can be readily separated from the optical storage media by, for example, a user-purchaser, a clerk, or other comparable mechanical force means. In embodiments where the machine readable mark is a magnetic stripe the article or the detachable member preferably has at least one flat edge to permit conventional scanning or "swiping" of the magnetic stripe. In embodiments the at least one detachable member can be, for example, from 2 to 10 detachable members.

Optical storage media includes, for example, known articles such as CD-ROM, CR-R, CD-RW, DVD, and the like discs and related articles that can be used for audio, video, data, and the like application for either or both storage and retrieval. It is readily appreciated that the storage medium disc or platen can be any suitable shape including but not limited to, for example, conventional disc or circular shaped platens, and can also include other shapes such as square, rectangular, triangular, notched, oval, and the like shapes. Any suitable platen shape encompasses geometries which are capable of being smoothly rotated on a flat face or side at high revolutions per second by a motor drive, such as found in CD, DVD, and the like rotatable optical storage media players. Platen geometries can include those shapes which approximately balance the weight distribution or average weight distribution about or on opposite sides of the rotational disc drive aperture (first aperture). when the platen is rotated at typical operational speeds.

The invention will be further illustrated by the following non-limiting Examples.

Example I

FIG. 1 shows an exemplary optical recording or storage disc (10) of the present invention with, for example, a shape and size of a credit card or a business card, and with a geometry and dimensional shape which permits accommodation and operation within a device, such as a CD-ROM player, for example, with a diameter (11) or width of less than or equal to an industry standard CDROM disc diameter of 4.69 inches, such as 3.375 inches, with disc balance or disc center of gravity about the center opening of the disc, and optionally having at least one flat edge (12) with a magnetic stripe (13) applied parallel to the flat edge. The magnetic stripe or any of the above mentioned alternative mark or indicia can be on either or both sides of the disc. The magnetic stripe can have any suitable width and length dimension and can be any suitable magnetic material, for example, either or both HiCo or LoCo material which materials are high coercivity and low coercivity grade materials, respectively, and are well known to those skilled in the art. The disc thickness where the magnetic stripe resides can be any thickness (14) that permits use in a normal card reader, for example, about 0.030 inches. The magnetic stripe can be applied to the article of manufacture, that is the disc, in any suitable manner, including but not limited to, for example, in-mold decoration, applied with pressure sensitive adhesive (PSA) label on reverse, or applied with heat activated adhesive such as hot stamping methods. FIG. 1 shows top and side views of the article including exemplary dimensions, such as an aperture (15) of diameter of about 0.59 inches, an optical media area of thickness (16) of about 0.046 inches, and a magnetic stripe "read area" (17) of about 0.625 inches. The machine readable indicia can be, for example, a magnetic stripe of from about 0.130 inches (1-track) to about 0.500 inches (3-track). The article can be used, for example, as a credit card, a gift card, a phone card with for example a standard CR80 size, and the like applications, and which article separately or interactively can provide access to data residing on the optical disc.

Example II

Figure 2:
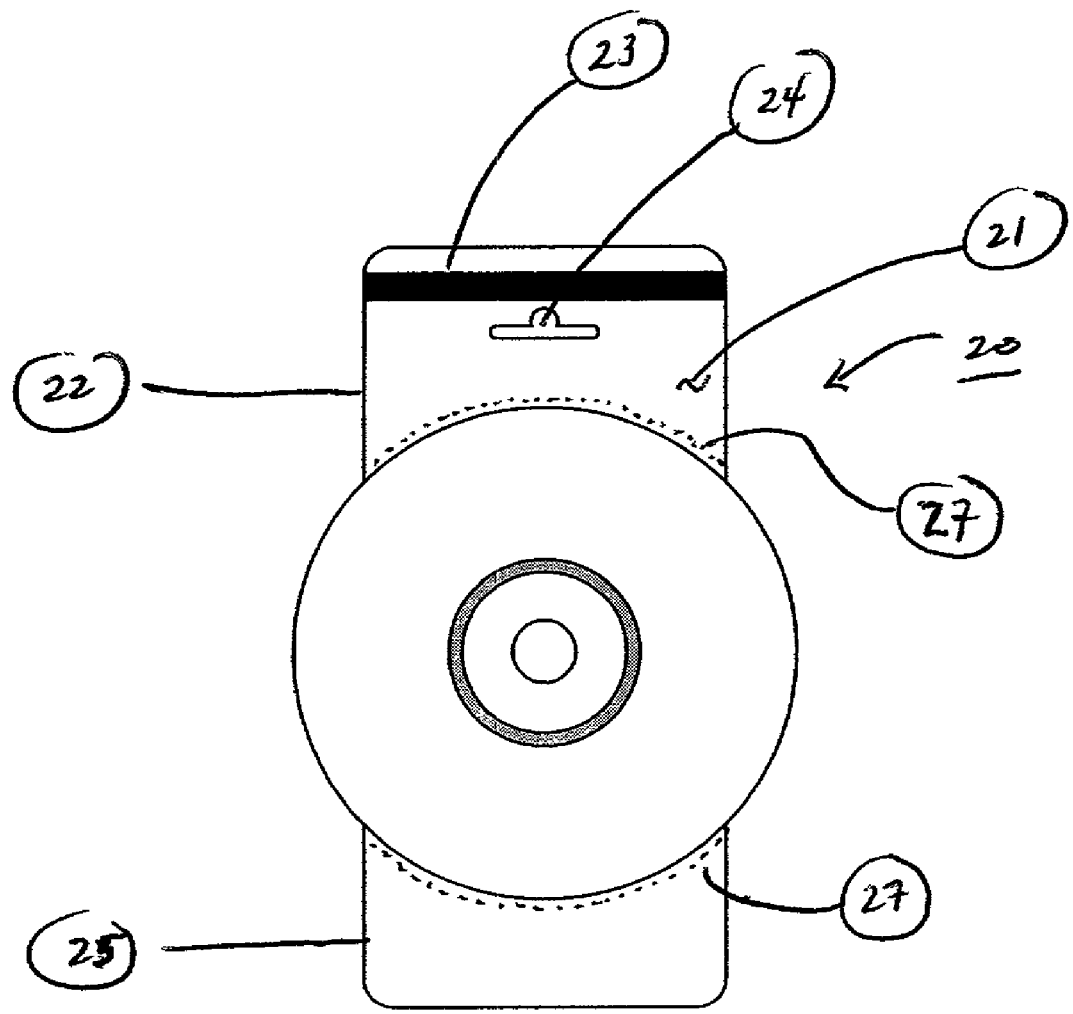

FIG. 2 shows a top view of another exemplary optical recording or storage disc article (20) of the present invention which article further includes, for example, a 0.030 inches thick injection molded hanger card or placard member (21). The hanger card member can include a first wing or first detachable member (22) which can include either or both the machine readable indicia (23) and a hanger hole (24). The first wing or first detachable member can be detached or broken away from the disc during or after activation by, for example, a user-purchaser or a clerk. Boundaries for detachment of a detachable member are demarcated by dotted lines. The hanger card member can optionally further include a second wing member (25) or multiple wing detachable members and which member(s) can also be readily detached or broken away from the disc by a user-purchaser and can optionally include either or both additional machine readable indicia or an additional hanger hole or holes (second aperture). It is also readily evident that the hanger hole and indicia can be on different or opposite detachable members if desired if more than one is present. It is also readily evident that different indicia can be applied to the same or different detachable member(s), such as a bar code on one wing and a magnetic stripe on another wing. The wing or detachable member(s) can be formed during the manufacture of the disc portion of the article or can be subsequently appended to the disc portion of the article by any suitable method. A preferred method of making the article with a detachable member or members is by a monolithic molding process, such as injection or press molding, which process includes a mold that produces an article with thinned, weakened, or a serrated boundary line between the disc and the detachable member(s) and which boundary line permits the above mentioned detachment or separation. Boundaries for detachment of a detachable member are demarcated by dotted lines (27).

Example III

Figure 3:
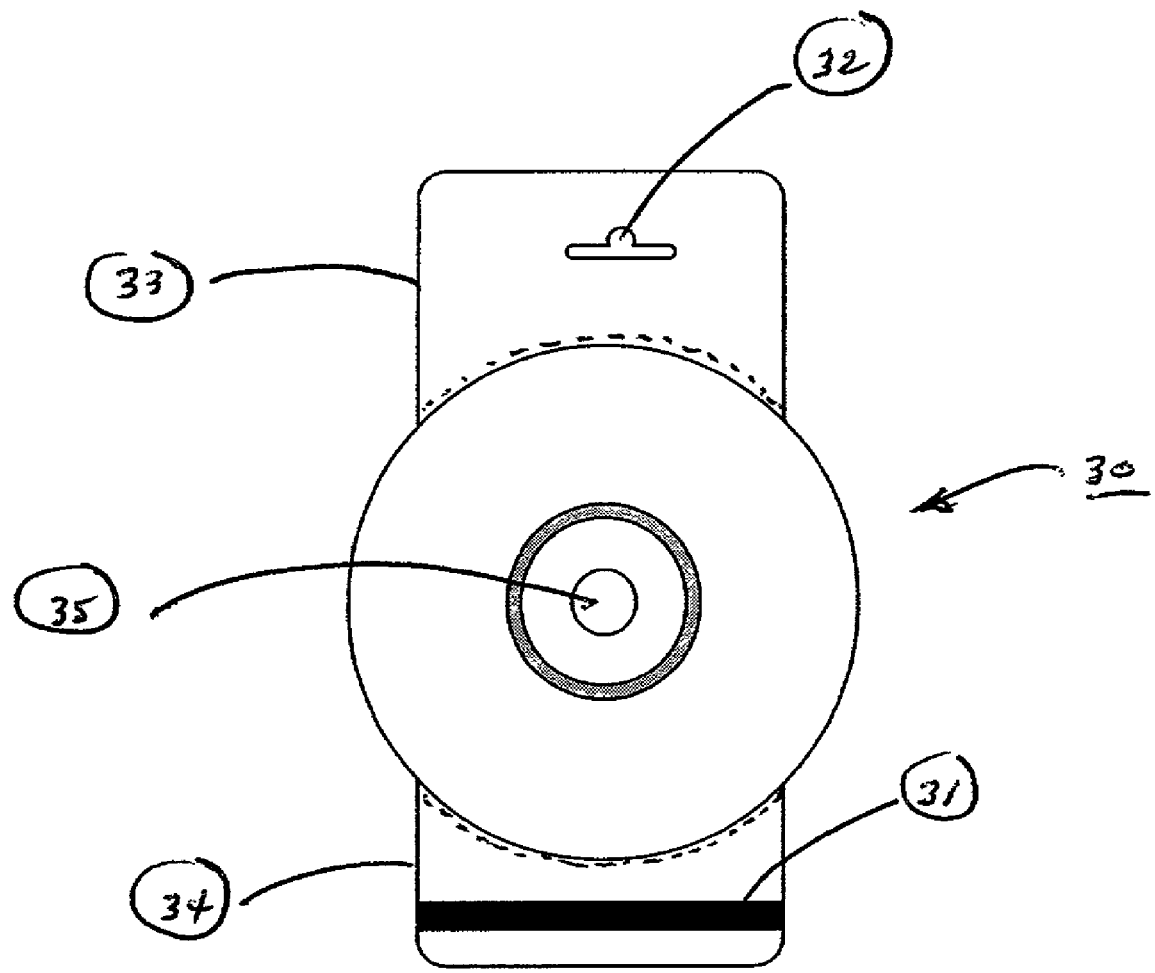

FIG. 3 shows a top view of another exemplary optical recording or storage disc article (30) of the present invention analogous to FIG. 2 with the exception that the magnetic stripe (31) and hanger hole (32) are on opposite hanger members or opposite detachable members (33 and 34). It is readily evident that different indicia can be applied to the same or different detachable member(s), such as a bar code on one wing and a magnetic stripe on another wing, or alternatively where the indicia is applied to two or more of the detachable member(s). It is also readily evident that different detachable members need not be symmetric about the center opening or first aperture (35) of the disc and the detachable members can be arranged in a variety of configurations or patterns such that approximate rotational balance or center of gravity is achieved or maintained when the wing or detachable members are detached from the disc portion of the article.

Example IV

Figure 4:
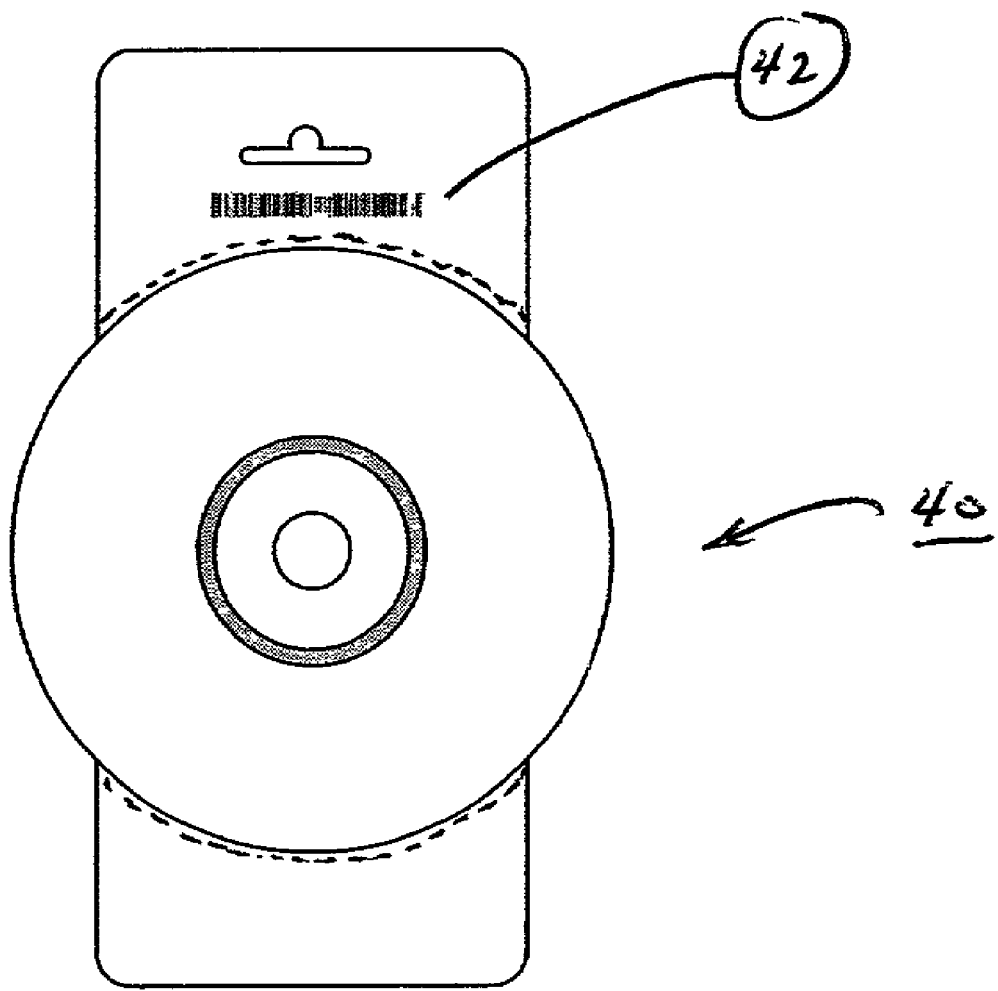

FIG. 4 shows a top view of another exemplary optical recording or storage disc article (40) of the present invention analogous to FIG. 2 with the exception that the machine readable indicia is a bar code pattern (42).

Example V

Figure 5:
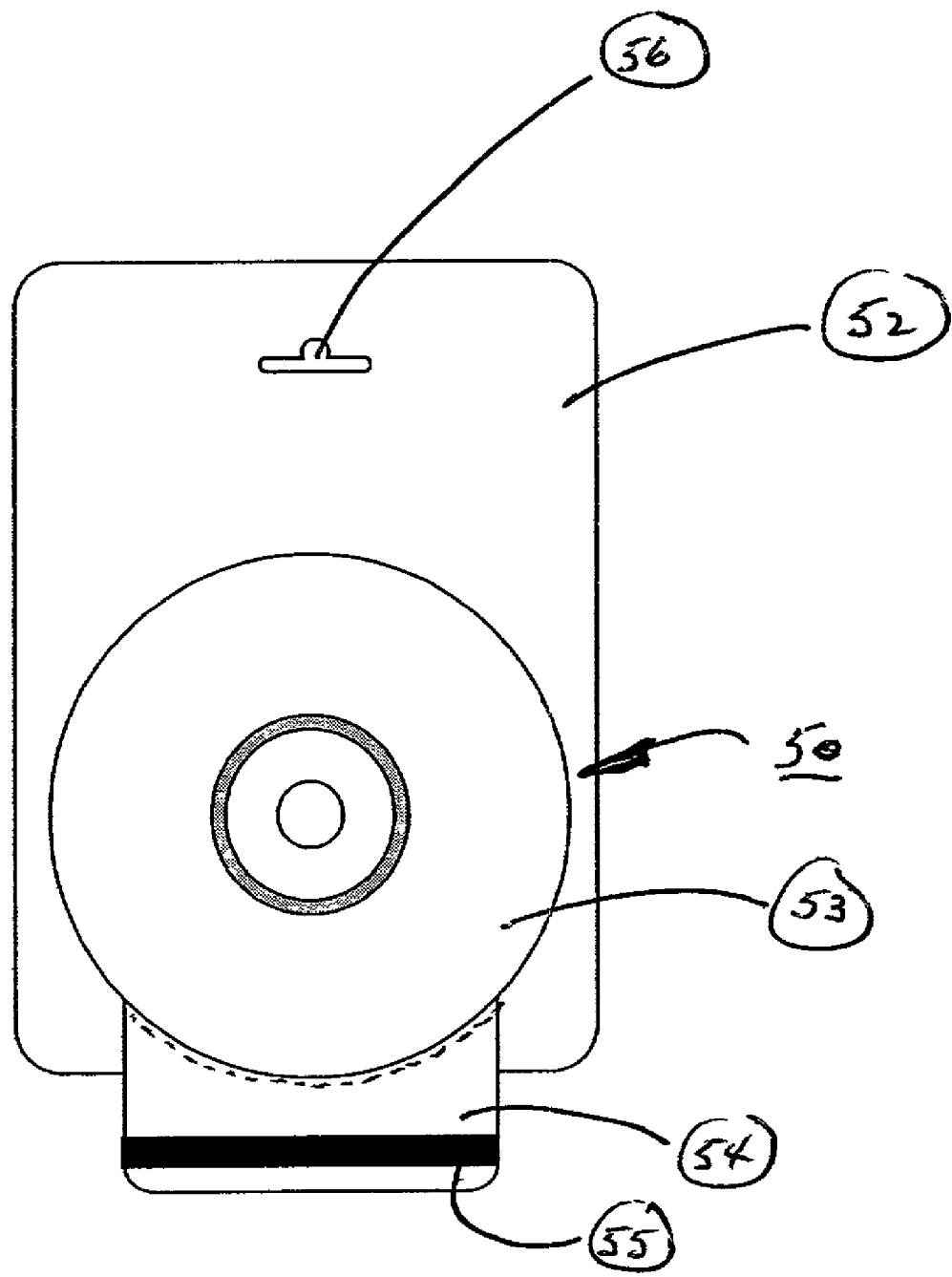

FIG. 5 shows a top view of another exemplary optical recording or storage disc article (50) of the present invention analogous to any of the above FIGS. 1–4 which further includes a separable package member or hanger card member (52) adapted to firstly mounting, attaching, or fixing the combined disc (53) and detachable member (54) bearing the machine readable indicia (55) to the package member, and to secondly permit hanging via hanger aperture (56) for display or marketing the package member with the attached combined disc and detachable member. The package member is separately separable from the combined disc and detachable member bearing the machine readable indicia. It is readily evident to one skilled in the art that that the package member can be used in combination with a disc bearing the machine readable indicia and without a detachable member, for example the article shown in FIG. 1 wherein the machine readable indicia area of the combined package member and article preferably extends beyond the edge of the packaging member to permit convenient machine reading of the indicia, for example, by maintaining and limiting the proper thickness range the magnetic stripe region to permit conventional reading in a magnetic stripe reading device.

Example VI

Figure 6:
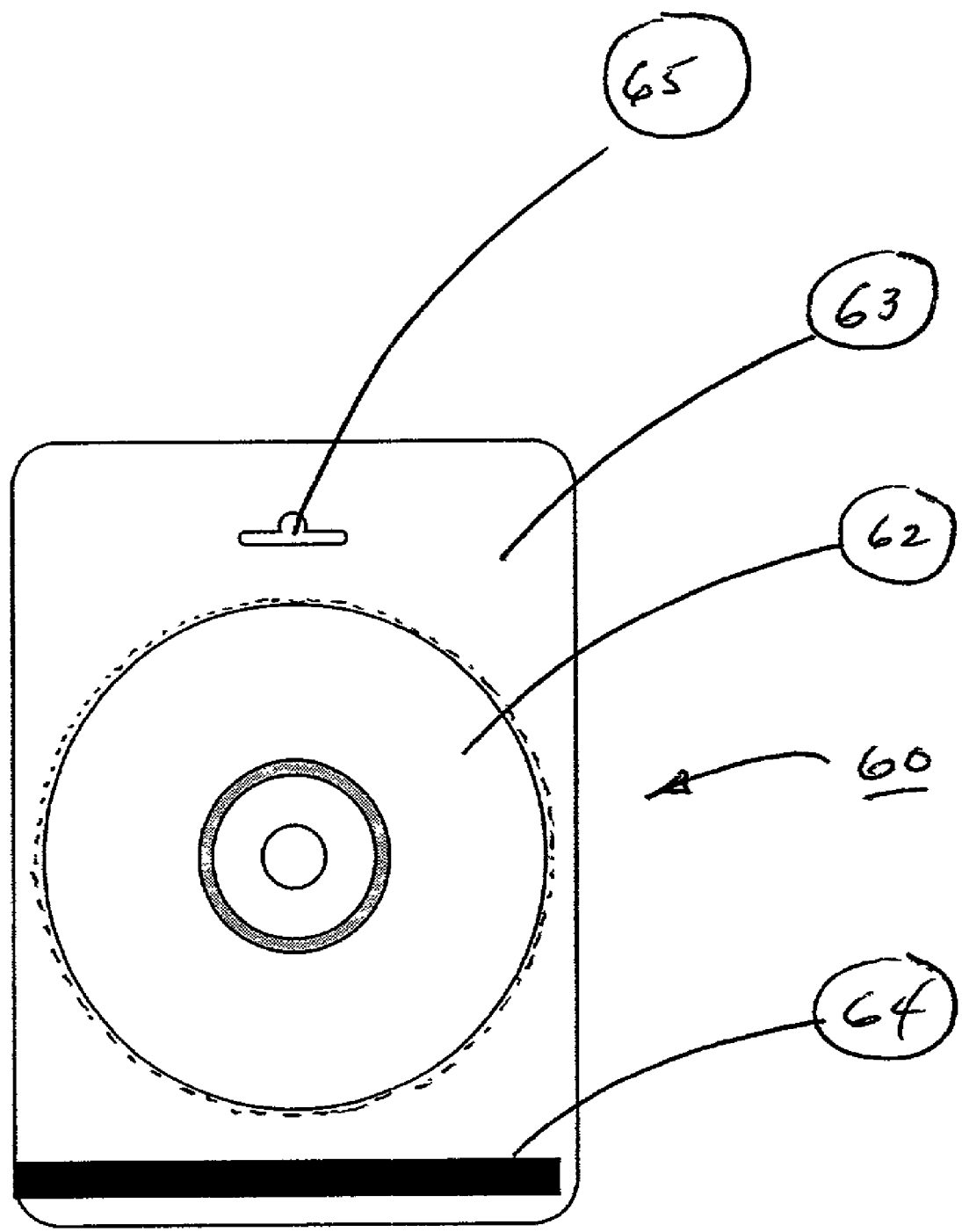

FIG. 6 shows a top view of another exemplary optical recording or storage disc article (60) of the present invention and includes an optical storage disc (62) attached to a separable or detachable package member (63) or backer card and which card bears the machine readable indicia (64) on either or both sides of the card and the card can include one or more a hanger holes or apertures (65) (second aperture).

Example VII

Figure 7:
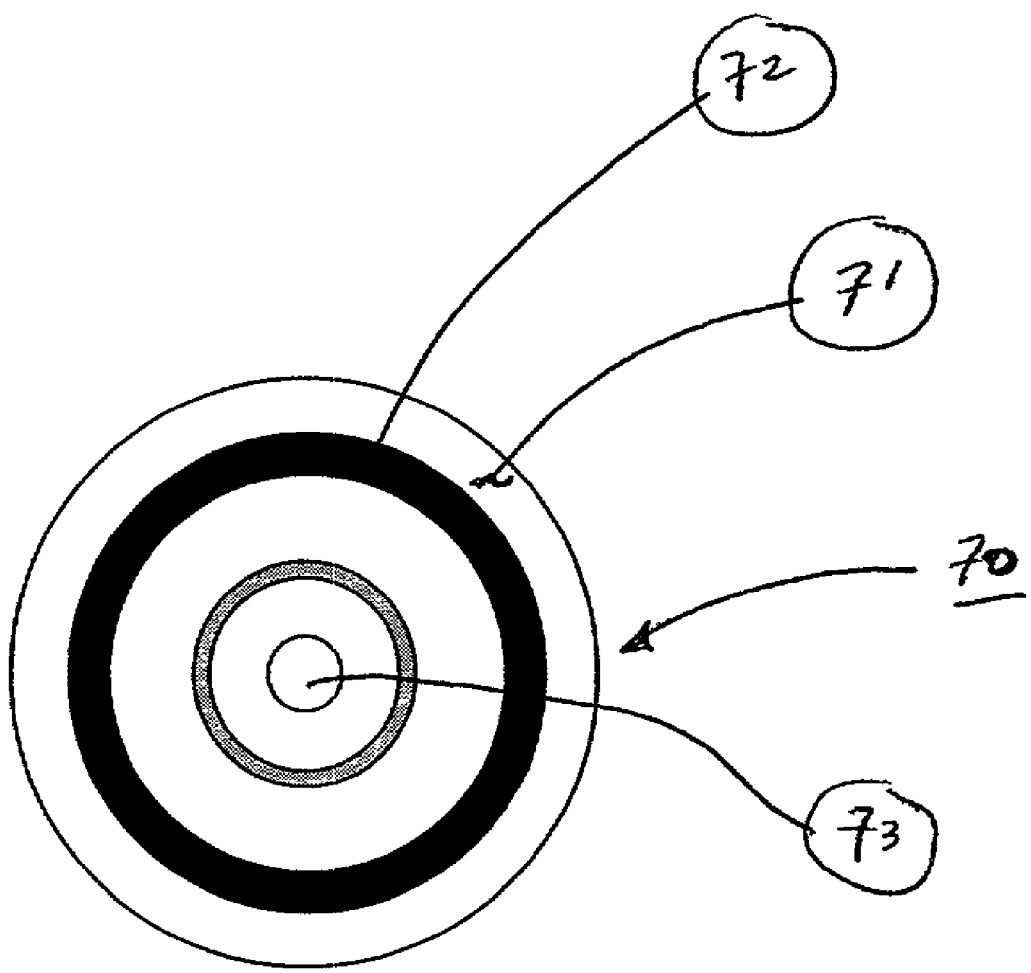
Figure 1:
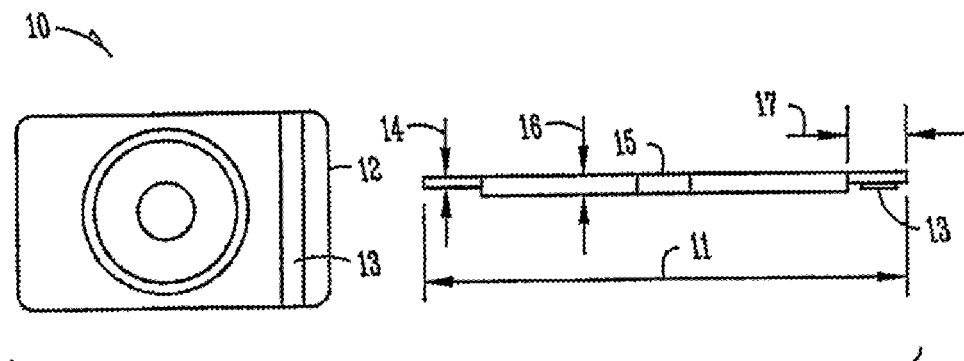
Figure 2:
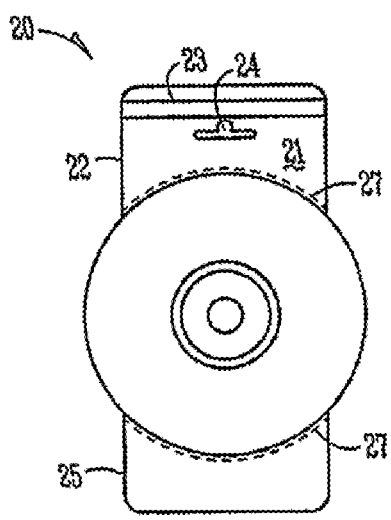
Figure 3:
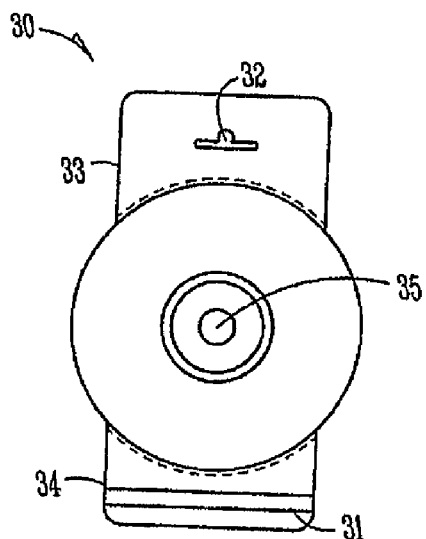
Figure 4:
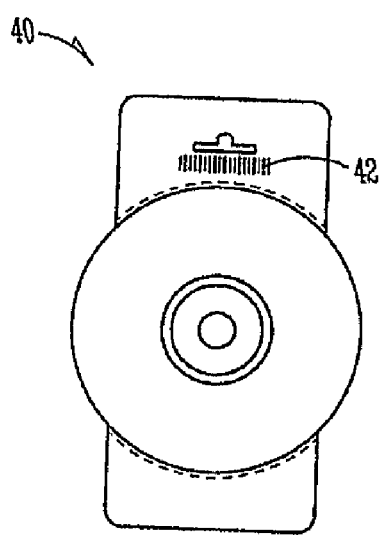
Figure 5:
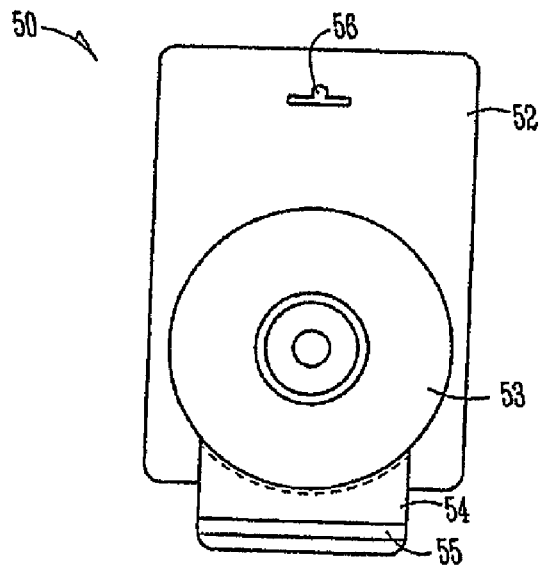
Figure 6:
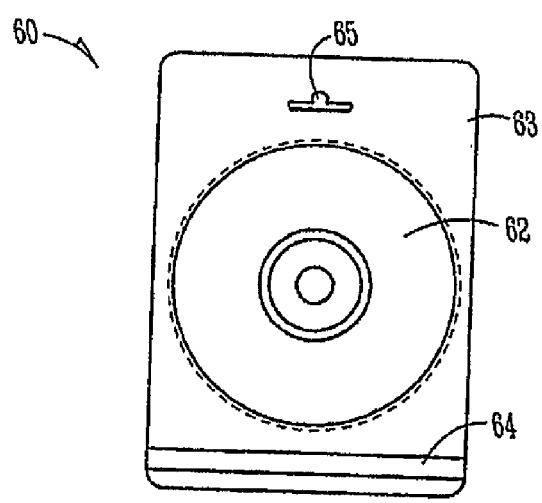
Figure 7:
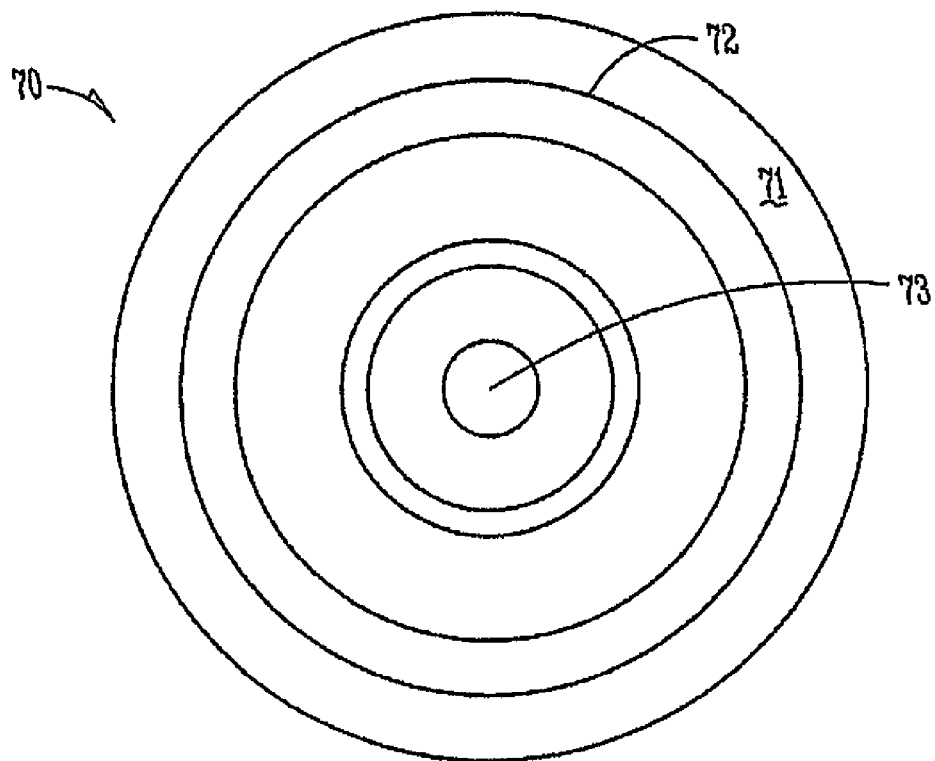
Figure 3:
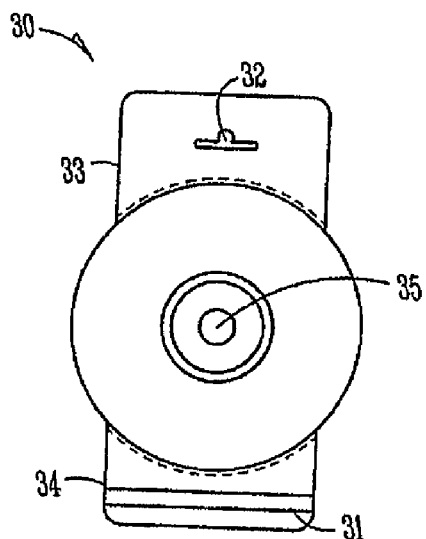
Figure 4:
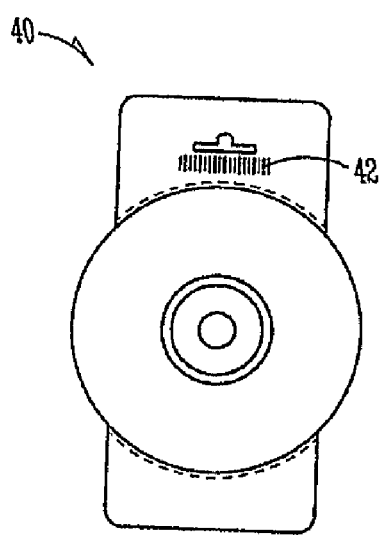
Figure 5:
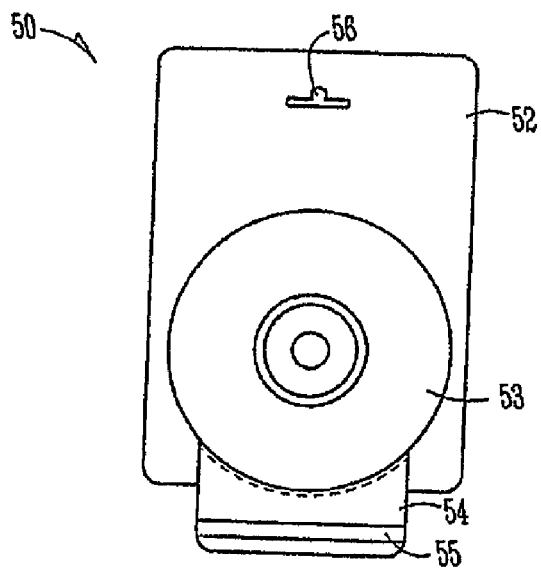
Figure 6:
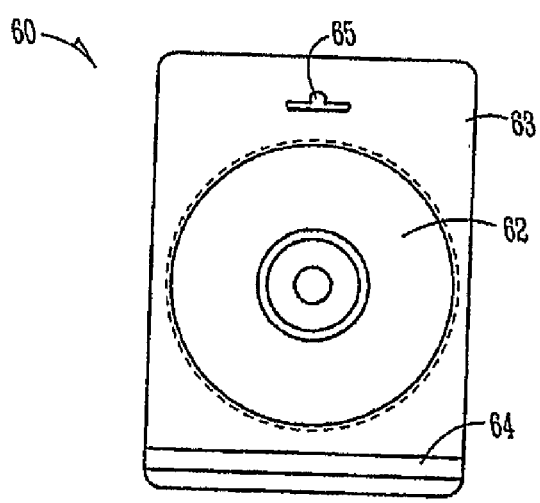
Figure 7:
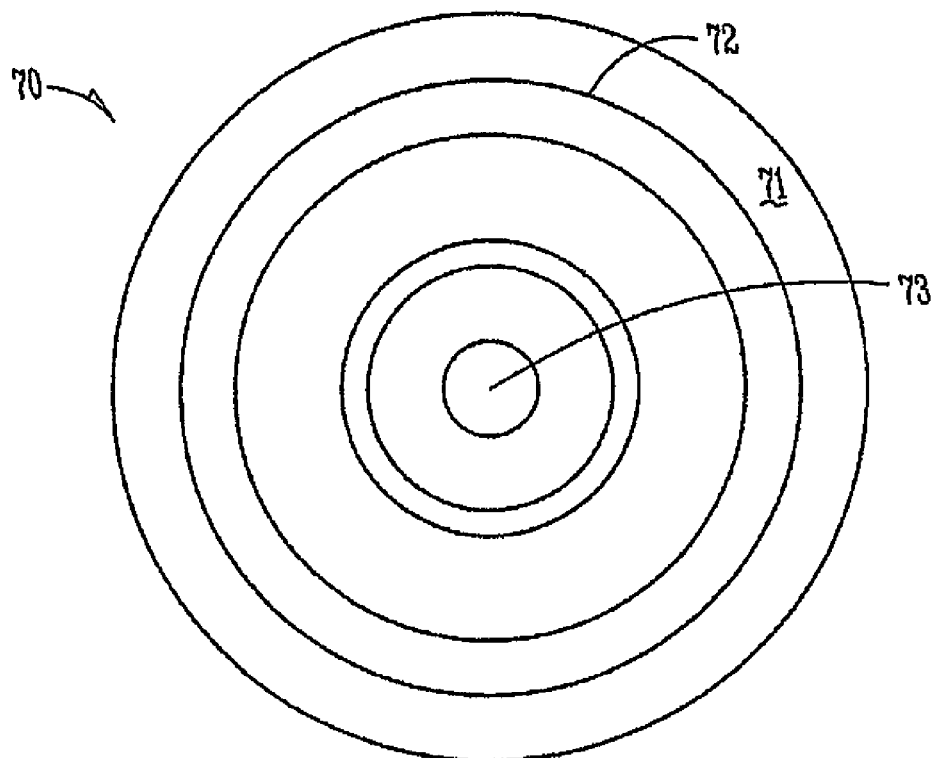

FIG. 7 shows another exemplary optical recording or storage disc article (70) of the present invention and includes a circular disc (71), or other suitable shape, with or without a package member or backer card and which circular disc bears the machine readable indicia (72) on either or both sides of the circular disc. The machine readable indicia in embodiments can be a magnetic stripe and which stripe has, for example, an arcuate or circular geometry and concentric about a common center of the disc drive aperture (first aperture) (73) and has, for example, inner and outer magnetic stripe edges equidistant from the edge of the disc and which stripe can be read, for example, by conventional "open-face" linear magnetic stripe readers. The arcuate or circular magnetic stripe in embodiments preferably contains a multiplicity of redundant magnetic information in the sectors about the magnetic arch or circle. The disc can optionally include one or more hanger holes or apertures (second aperture)(not shown).

The invention has been described with reference to various specific and preferred embodiments and techniques. However, it should be understood that many variations and modifications may be made while remaining within the spirit and scope of the invention.

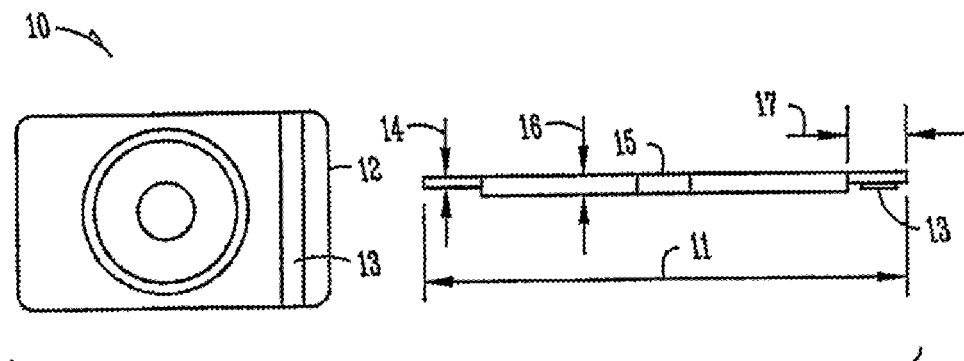
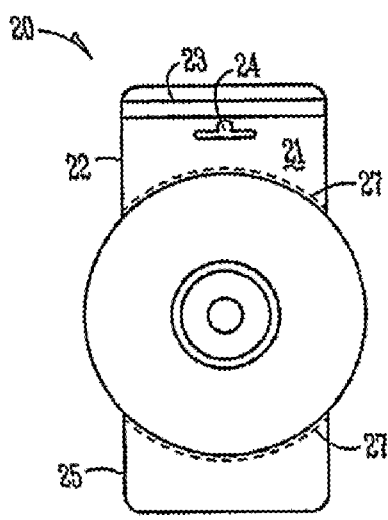

What is claimed is:

1. An article of manufacture comprising:
    an optical storage medium;
    a detachable member separable from the optical storage medium wherein the detachable member and the optical storage medium are separable at a thinned, weakened or serrated boundary; and
    a machine readable mark on the detachable member, wherein the machine readable mark is adapted to permit activation of a metered account for use of the optical storage medium, wherein the machine readable mark comprises a bar code whereby decoding the bar code permits activation of the metered account, a magnetic strip whereby decoding the magnetic strip permits activation of the metered account, or a glyph code whereby decoding the glyph code permits activation of the metered account.

2. The article in accordance with claim 1, wherein activation of a metered account comprises activation of billing privileges.

3. The article in accordance with claim 2, wherein activation of the metered account further comprises activation of the optical storage medium.

4. The article in accordance with claim 1, wherein the optical storage medium has a first aperture there through adapted to permit mechanical rotation of the medium.

5. The article in accordance with claim 4, wherein the article has a second aperture there through adapted to permit the article to receive a hanger member to facilitate vendor display of the article.

6. The article in accordance with claim 1, wherein the optical storage medium is a readable, writeable, or read-writeable platen.

7. The article in accordance with claim 1, wherein the article comprises 2 to 10 detachable members.

8. The article in accordance with claim 1, wherein the detachable member has at least one flat edge.

9. The method of claim 1 wherein the optical storage medium and the detachable member are prepared by a monolithic molding process.

10. An article of manufacture comprising:
    an optical storage medium; and
    a detachable member attached to the optical storage medium, wherein the detachable member and the optical storage medium are separable at a thinned, weakened or serrated boundary, wherein the detachable member bears a machine readable mark on at least one side, wherein the machine readable mark is adapted to permit activation of a metered account for use of the optical storage medium, wherein the detachable member is detached from the optical storage medium after activation of the metered account, and wherein the machine readable mark comprises a bar code whereby decoding the bar code permits activation of the metered account, a magnetic strip whereby decoding the magnetic strip permits activation of the metered account, or a glyph code whereby decoding the glyph code permits activation of the metered account.

11. The article in accordance with claim 10, wherein the optical storage medium is a platen.

12. The article in accordance with claim 10, wherein the machine readable mark is a magnetic stripe.

13. The article of claim 12 wherein the optical storage medium and the detachable member are prepared by a monolithic molding process.

14. A method comprising:
    receiving an article comprising an optical storage medium; a detachable member separable from the optical storage medium, wherein the detachable member and the optical storage medium are separable at a thinned, weakened or serrated boundary; and a machine readable mark on the detachable member, wherein the machine readable mark is adapted to permit activation of a metered account for use of the optical storage medium, wherein the machine readable mark comprises a bar code whereby decoding the bar code permits activation of the metered account, a magnetic strip whereby decoding the magnetic strip permits activation of the metered account, or a glyph code whereby decoding the glyph code permits activation of the metered account; and
    scanning or machine reading the machine readable mark or marks on the article to activate the metered account and which metered account corresponds to an particular identification number, and separating the detachable member from the optical storage medium.

15. A method comprising:
    providing an optical storage medium and a detachable member attached to the storage medium, wherein the detachable member and the optical storage medium are separable at a thinned, weakened or serrated boundary;
    applying a machine readable mark to the detachable member; and
    encoding the resulting machine readable mark with either or both metered account information and identification number information, wherein the machine readable mark is adapted to permit activation of a metered account for use of the optical storage medium, and wherein the machine readable mark comprises a bar code whereby decoding the bar code permits activation of the metered account, a magnetic strip whereby decoding the magnetic strip permits activation of the metered account, or a glyph code whereby decoding the glyph code permits activation of the metered account.

16. The method of claim 15 wherein the machine readable mark is magnetic.

17. The method of claim 15 wherein applying a machine readable mark is accomplished with a MICR printer.

18. The method of claim 15 wherein applying a machine readable mark is accomplished with an ink jet printer.

19. The method of claim 15 wherein encoding the resulting machine readable mark is accomplished with an ink jet printer.

* * * * *

UNITED STATES PATENT AND TRADEMARK OFFICE
CERTIFICATE OF CORRECTION

PATENT NO.        : 7,117,512 B1
APPLICATION NO. : 10/146477
DATED             : October 3, 2006
INVENTOR(S)       : Bill Cahill It is certified that error appears in the above-identified patent and that said Letters Patent is hereby corrected as shown below:

Please replace the informal drawings appearing on sheets 1–7 and on the Title page of the patent with the enclosed "Replacement Sheets" pages 1–4 for figures 1–7.

The title page showing the illustrative Fig should be deleted and replace with the attached title page Signed and Sealed this Twenty-first Day of August, 2007

JON W. DUDAS
*Director of the United States Patent and Trademark Office*

(12) United States Patent
Cahill

(10) Patent No.: US 7,117,512 B1
(45) Date of Patent: Oct. 3, 2006

(54) SCAN ACTIVATED OPTICAL STORAGE ARTICLE AND METHODS THEREOF

(75) Inventor: Bill Cahill, Eagan, MN (US)

(73) Assignee: Travel Tags, Inc., North Mankato, MN (US)

( * ) Notice: Subject to any disclaimer, the term of this patent is extended or adjusted under 35 U.S.C. 154(b) by 0 days.

(21) Appl. No.: 10/146,477

(22) Filed: May 15, 2002

Related U.S. Application Data

(60) Provisional application No. 60/291,246, filed on May 15, 2001.

(51) Int. Cl.
G11B 3/70 (2006.01)
(52) U.S. Cl. .................................................. 720/745
(58) Field of Classification Search ............. 369/273; 235/380, 487, 454; 720/718, 745
See application file for complete search history.

(56) References Cited

U.S. PATENT DOCUMENTS

| | | | |
|---|---|---|---|
| 4,812,633 A * | 3/1989 | Vogelgesang et al. | 235/487 |
| 4,868,373 A * | 9/1989 | Opheij et al. | 235/380 |
| 4,978,146 A | 12/1990 | Warther et al. | 283/81 |
| 5,168,147 A | 12/1992 | Bloomberg | 235/456 |
| 5,495,981 A | 3/1996 | Warther | 229/71 |
| 5,579,296 A * | 11/1996 | Smith et al. | 369/273 |
| 5,720,158 A | 2/1998 | Goade, Sr. | 53/460 |
| 5,769,457 A | 6/1998 | Warther | 283/61 |
| 5,777,305 A | 7/1998 | Smith et al. | 235/380 |
| 5,918,909 A | 7/1999 | Fiala et al. | 283/61 |
| 5,921,584 A | 7/1999 | Goade, Sr. | 283/107 |
| 5,940,363 A * | 8/1999 | Ro et al. | 369/273 |
| 6,039,356 A | 3/2000 | Warther et al. | 283/61 |
| 6,173,901 B1 | 1/2001 | McCannel | 235/493 |
| 6,208,771 B1 | 3/2001 | Jared et al. | 382/306 |
| 6,484,940 B1 * | 11/2002 | Dilday et al. | 235/454 |
| 6,510,124 B1 * | 1/2003 | Wood | 369/273 |
| 6,588,658 B1 | 7/2003 | Blank | 235/380 |
| 7,032,817 B1 | 4/2006 | Blank | 235/380 |
| 2002/0020740 A1 * | 2/2002 | Aarons | 235/380 |
| 2002/0131359 A1 * | 9/2002 | Wood | 369/273 |
| 2002/0167890 A2 * | 11/2002 | Duroj | 369/273 |

FOREIGN PATENT DOCUMENTS

GB 2297187 A * 7/1996

OTHER PUBLICATIONS

"ticketCDs—products and applications", *Cutting Edge ShapeCD*, http://www.cdshapes.com/products/ticket-cds.html, (2001), 1 page.
Microsoft Corporation, "Introducing RiverBorne™ Communications," Feb. 23, 2001, pp. 1-17.

* cited by examiner

*Primary Examiner*—A. J. Heinz
*Assistant Examiner*—Mark Blouin
(74) *Attorney, Agent, or Firm*—Westman, Champlin & Kelly

(57) ABSTRACT

An article including: an optical storage medium; and a machine readable mark on at least one side of the optical storage medium, wherein the machine readable mark is adapted to permit activation of a metered account. In embodiments the article can include a detachable member attached to the storage medium, where the detachable member bears a machine readable mark on at least one side and the detachable member can be detached from the optical storage medium after activation of the metered account. The invention also includes printing methods for making the article.

19 Claims, 7 Drawing Sheets

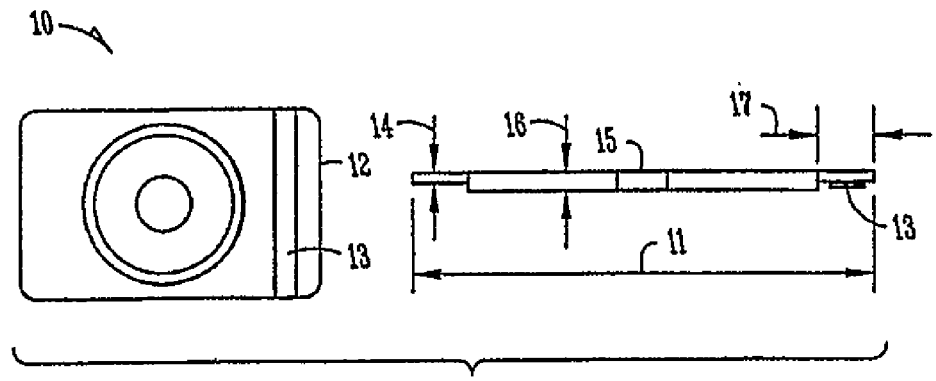

UNITED STATES PATENT AND TRADEMARK OFFICE
CERTIFICATE OF CORRECTION

| | | |
|---|---|---|
| PATENT NO. | : 7,117,512 B1 | |
| APPLICATION NO. | : 10/146477 | |
| DATED | : October 3, 2006 | |
| INVENTOR(S) | : Bill Cahill | |

It is certified that error appears in the above-identified patent and that said Letters Patent is hereby corrected as shown below:

Please replace the informal drawings appearing on sheets 1–7 and on the Title page of the patent with the enclosed "Replacement Sheets" pages 1–4 for figures 1–7.

The title page showing the illustrative Fig should be deleted and replace with the attached title page This certificate supersedes Certificate of Correction issued August 21, 2007.

Signed and Sealed this

Eighteenth Day of September, 2007

JON W. DUDAS
*Director of the United States Patent and Trademark Office*

(12) United States Patent
Cahill

(10) Patent No.: US 7,117,512 B1
(45) Date of Patent: Oct. 3, 2006

(54) SCAN ACTIVATED OPTICAL STORAGE ARTICLE AND METHODS THEREOF

(75) Inventor: Bill Cahill, Eagan, MN (US)

(73) Assignee: Travel Tags, Inc., North Mankato, MN (US)

(*) Notice: Subject to any disclaimer, the term of this patent is extended or adjusted under 35 U.S.C. 154(b) by 0 days.

(21) Appl. No.: 10/146,477

(22) Filed: May 15, 2002

Related U.S. Application Data

(60) Provisional application No. 60/291,246, filed on May 15, 2001.

(51) Int. Cl.
G11B 3/70 (2006.01)
(52) U.S. Cl. .................................................. 720/745
(58) Field of Classification Search ............ 369/273; 235/380, 487, 454; 720/718, 745
See application file for complete search history.

(56) References Cited

U.S. PATENT DOCUMENTS

| | | | |
|---|---|---|---|
| 4,812,633 A * | 3/1989 | Vogelgesang et al. | 235/487 |
| 4,868,373 A * | 9/1989 | Opheij et al. | 235/380 |
| 4,978,146 A | 12/1990 | Warther et al. | 283/81 |
| 5,168,147 A | 12/1992 | Bloomberg | 235/456 |
| 5,495,981 A | 3/1996 | Warther | 229/71 |
| 5,579,296 A * | 11/1996 | Smith et al. | 369/273 |
| 5,720,158 A | 2/1998 | Goade, Sr. | 53/460 |
| 5,769,457 A | 6/1998 | Warther | 283/81 |
| 5,777,305 A | 7/1998 | Smith et al. | 235/380 |
| 5,918,909 A | 7/1999 | Fiala et al. | 283/81 |
| 5,921,584 A | 7/1999 | Goade, Sr. | 283/107 |
| 5,940,363 A * | 8/1999 | Ro et al. | 369/273 |
| 6,039,356 A | 3/2000 | Warther et al. | 283/61 |
| 6,173,901 B1 | 1/2001 | McCannel | 235/493 |
| 6,203,771 B1 | 3/2001 | Jared et al. | 362/306 |
| 6,484,940 B1 * | 11/2002 | Dilday et al. | 235/454 |
| 6,510,124 B1 * | 1/2003 | Wood | 369/273 |
| 6,588,658 B1 | 7/2003 | Blank | 235/380 |
| 7,032,817 B1 | 4/2005 | Blank | 235/380 |
| 2002/0026740 A1 * | 2/2002 | Aarons | 235/380 |
| 2002/0131359 A1 * | 9/2002 | Wood | 369/273 |
| 2002/0167890 A2 * | 11/2002 | Daroj | 369/273 |

FOREIGN PATENT DOCUMENTS

GB 2297187 A * 7/1996

OTHER PUBLICATIONS

"ticketCDs—products and applications", Cutting Edge ShapeCD, http://www.edzinapes.com/products/ticket-cds.html, (2001), 1 page.
Microsoft Corporation, "Introducing RiverBone™ Communications," Feb. 22, 2001, pp. 1-17.

* cited by examiner

Primary Examiner—A. J. Heinz
Assistant Examiner—Mark Blouin
(74) Attorney, Agent, or Firm—Westman, Champlin & Kelly

(57) ABSTRACT

An article including: an optical storage medium; and a machine readable mark on at least one side of the optical storage medium, wherein the machine readable mark is adapted to permit activation of a metered account. In embodiments the article can include a detachable member attached to the storage medium, where the detachable member bears a machine readable mark on at least one side and the detachable member can be detached from the optical storage medium after activation of the metered account. The invention also includes printing methods for making the article.

19 Claims, 4 Drawing Sheets

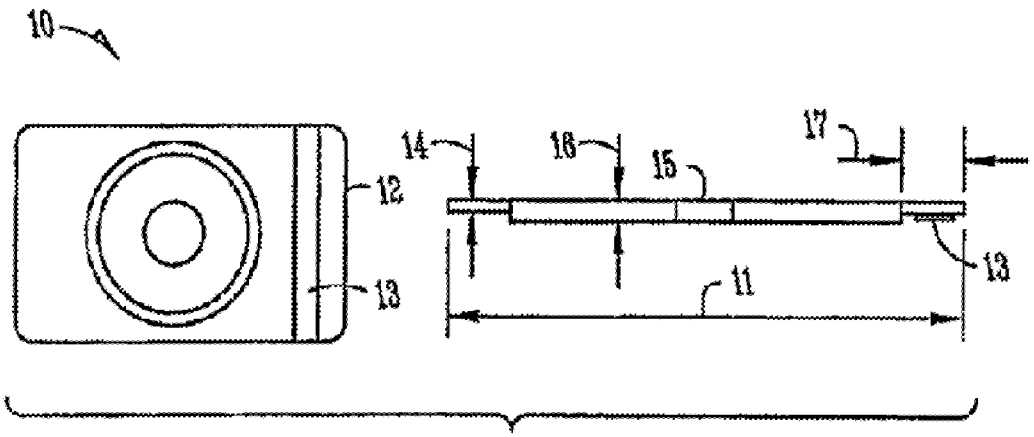

Fig. 1